F. X. MOERK.
CALENDAR.
APPLICATION FILED JAN. 18, 1916.

1,222,655.

Patented Apr. 17, 1917.
3 SHEETS—SHEET 1.

FIG. 1.

INVENTOR
Frank X. Moerk
BY
Frank S. Busser
ATTORNEY.

WITNESS:

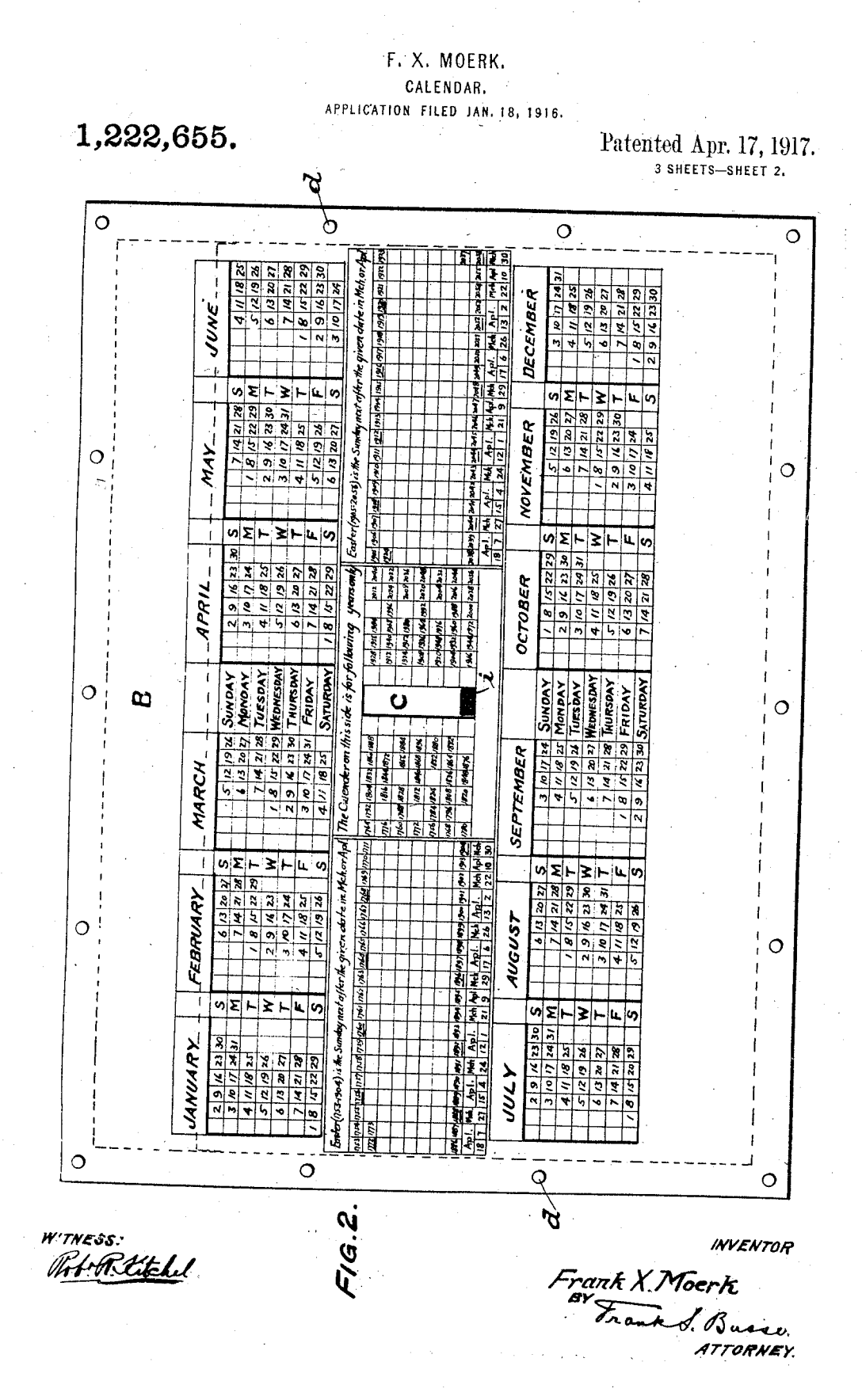

F. X. MOERK.
CALENDAR.
APPLICATION FILED JAN. 18, 1916.

1,222,655.

Patented Apr. 17, 1917.
3 SHEETS—SHEET 2.

FIG. 2.

INVENTOR
Frank X. Moerk
BY
Frank S. Busse
ATTORNEY.

WITNESS:

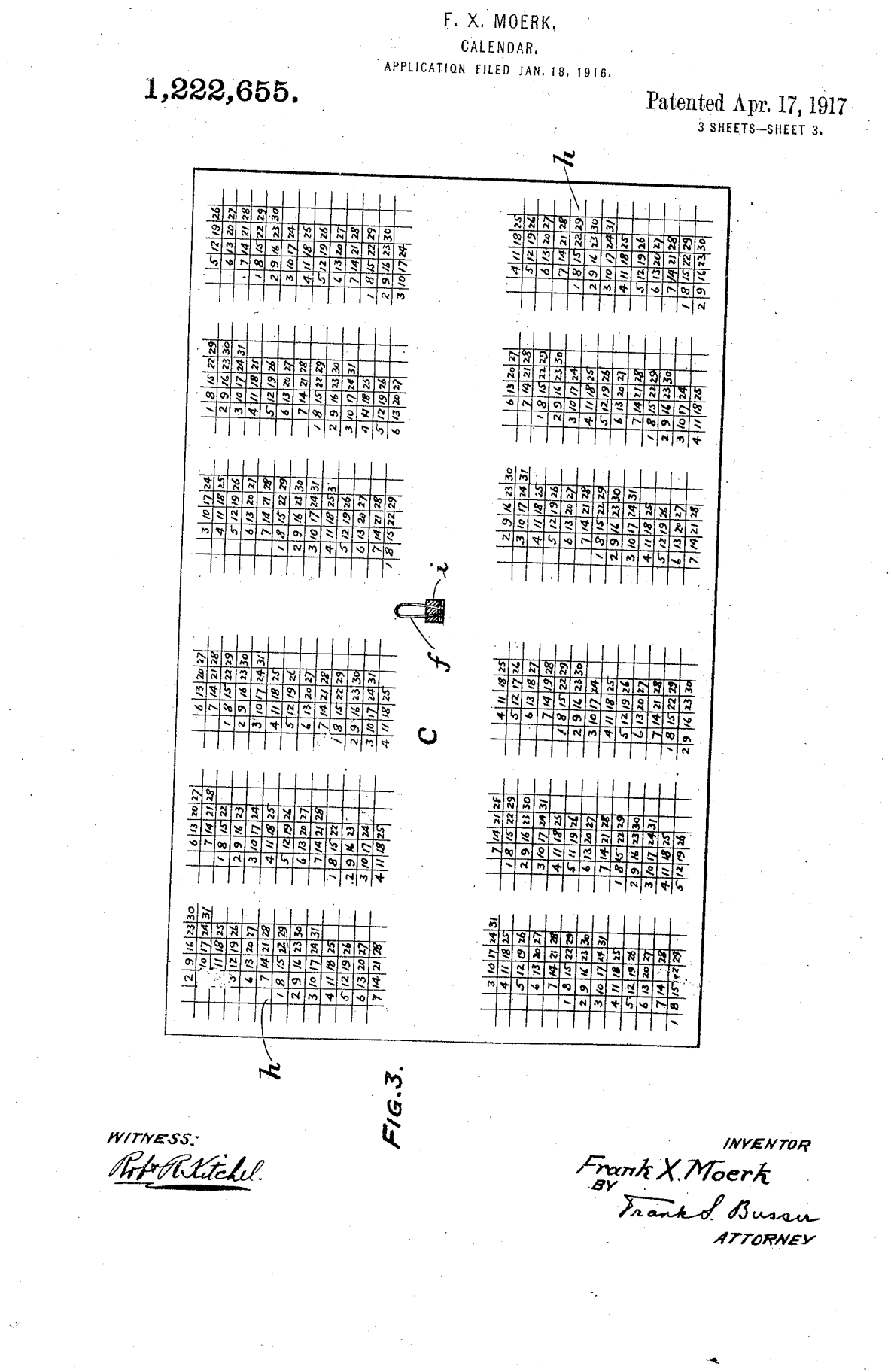

F. X. MOERK.
CALENDAR.
APPLICATION FILED JAN. 18, 1916.

1,222,655.

Patented Apr. 17, 1917
3 SHEETS—SHEET 3.

FIG. 3.

WITNESS:
Robt R Kitchel.

INVENTOR
Frank X. Moerk
BY
Frank S. Busser
ATTORNEY

UNITED STATES PATENT OFFICE.

FRANK X. MOERK, OF OAK LANE, PENNSYLVANIA.

CALENDAR.

1,222,655.  Specification of Letters Patent.  Patented Apr. 17, 1917.

Application filed January 18, 1916. Serial No. 72,669.

*To all whom it may concern:*

Be it known that I, FRANK X. MOERK, a citizen of the United States, residing at Oak Lane, county of Philadelphia, and State of Pennsylvania, have invented a new and useful Improvement in Calendars, of which the following is a full, clear, and exact description, reference being had to the accompanying drawings, which form a part of this specification.

My invention relates to the class of devices known as "perpetual calendars", whereby a correct yearly calendar is readily produced to suit the present time and also an indefinite number of years past and to come.

My invention is a new and useful form of said calendar, and has for its object, primarily, the display at one time of the twelve months of a year, in which a slight shifting of parts so changes the relation of the days of the months to the fixed regular forms of the days of the week, as to produce a readable calendar which shall be correct in said relation for any year, "common" as well as "leap".

My calendar is of simple form and to effect the shifting referred to requires no complicated parts nor abstruse calculations. It consists of but two parts, slidable the one within the other, the inner one bearing the numerals representing the days of the months, and the enveloping ones each bearing the words representing the days of the week for the twelve months and also the numerals representing the years for which the calendar may be used. The scope of the calendar is only limited by the number of years appearing thereon, which may, for example, be 300 years; as in the particular example of the calendar which I will now proceed to describe, in connection with the accompanying drawings, in which—

Figure 1 represents a face view of my calendar, usable for "common" years only.

Fig. 2 represents a rear view of same, usable for "leap" years only, and shown as set correctly for the present year 1916.

Fig. 3 represents one face of the interior sliding member by itself.

As before stated, the structure of my calendar is very simple, consisting in the present instance of three sheets of card board. Sheet A, forming the front face, and sheet B forming the rear face, are bound together around the edges, as indicated in the drawing, by fasteners *d*. Suitable spacing strips are bound in between the sheets along the edges, to prevent their binding upon the third sheet, C, which occupies the space within the envelop formed by the structure described, and is slidable therein.

Sheet C is of sufficient length to reach from end to end of the interior of said envelop, but its height is less than the height of the envelop. Thus the before mentioned spacing strips at the ends form a guideway between which sheet C is slidable up and down a certain distance limited by the spacing strips at top and bottom.

There is a slot *e* in the middle of sheet A, providing an opening in which a small collapsible handle *f* attached to sheet C, may be utilized to slide sheet C up and down in the envelop.

The front face of the calendar is designed to be used for "common" years and the rear face for "leap" years and they are similar in form. The small handle *f*, which is arranged to fold back into slot *e* to preserve a flat, thin form for mailing, may be attached on either front or back side, or both, as desired.

Both sheets A and B are provided with twelve rectangular openings *g* arranged in two rows of six each, one row being above the central slot C, and the second row below said slot, and each opening is headed with the name of a month, in order, from January to December, on each face.

Down the edges of the openings, on the strips of sheets A and B forming the sides thereof, are arranged the days of the week in regular order, reading downwardly beside each opening, from Sunday to Saturday.

Certain portions *h* of sheet C are therefore made visible through said openings and these portions are divided by vertical and horizontal lines into calendar form. This gives seven horizontal rows visible in each opening *g*, one row in line with each day of the week before mentioned. The numerals representing the days of the month appear in calendar form in each of the twelve openings in both faces of the calendar, and in order to explain how they are adjusted to suit various years, we will take a certain single month as an example, say the month of January, as shown on Fig. 1.

Here it is seen the numerals are 31 in number, as is correct for January, and 1 is a Saturday, and appears at the bottom of the second column as visible in the opening. Now it is readily seen that in order to arrange for any and all years, provision must be made for 1 to appear opposite any one of the days in the week, that is, it must be possible to have 1 appear in six other lines opposite the other six days of the week.

The form $h$ is continued down on sheet C below the part visible in Fig. 1, a distance of six more horizontal rows of the form, which rows contain numerals arranged consecutively down the column, the numerals in succeeding columns being greater by seven than the numerals in the column preceding it. By moving sheet C upward, as provided for, from the lowest position shown in the drawing, the first day of January may be made to come in line with any day of the week desired, and in any of the seven positions it may assume there will be visible 31 consecutive numbers in the January opening properly arranged in calendar form.

The numerals in the next month are arranged to begin on the horizontal line following that upon which the final numeral of the January days appear. Thus, in the figure, the last day of January 31 is a Monday. Therefore the February numerals are made to start with 1 on the Tuesday line. This being the "common" year side of the calendar, the February numerals end with 28, which is seen to be in the Monday line. Therefore the March numerals begin with 1 on the Tuesday line. Here we again have 31 days, ending in the Thursday line, so the April numerals begin with 1 on the Friday line. Thus one month succeeds another throughout the twelve, as visible through the twelve openings. In each case, the form on sheet C, for each opening, extends six lines farther down. These show through said opening, as described for the month of January.

Thus it is seen that if the first day of January is made to occur on the correct day of the week for any certain year, by moving sheet C as described, the whole year's calendar is at once arranged, the days and months following each other in sequence and without gap, as they should. This is, of course, for the "common" year. If the year desired is a "leap" year, the opposite side of the calendar should be used, which is arranged exactly the same as the front side with the exception that 29 days appear in February instead of the 28 shown on the front face.

It only remains now to indicate at which of the seven possible positions to place sheet C in order that January 1 shall come on the correct day of the week for any certain year. To do this I have arranged the numbers of all the years for which the calendar is intended to be used, upon the front sheet, in the following way.

On sheet C, I have placed an indicating mark $i$ near handle $f$, so that said mark is visible in any position of sheet C from the top to the bottom of its movement. Inasmuch as this movement covers seven stated positions, I have arranged a table consisting of horizontal lines on each side of slot $e$, upon front sheet $A$, providing for a horizontal row of years in line with each of the seven stated positions.

To the left of slot $e$ appear the numbers of past years from 1904 going backward as far as desired—in this case 150 years—to the year 1758. Similarly, to the right of slot $e$ appear the numbers of the years after 1904 for a similar period in the future—beginning with 1905 and running up to 2056.

These year numbers are arranged consecutively, so it is a simple matter to find any year desired; and they are so arranged in the horizontal table that when sheet C is moved until the indicating mark $i$ thereon comes in line with the number of the year desired, the calendar will be set correctly for that year.

In this table of years, the numbers of all the years occur, but as the front face of the calendar is only correct for "common" years, I have designated the "leap" years appearing in this table in some special way, such as underscoring, as shown in the drawing; or they may be printed in red, or otherwise, to differentiate them.

On the rear face of the calendar appears a year table similar to the one on the front face, except that here the numbers of "leap" years only occur, as this side is correct only for "leap" years. As this requires only about one quarter the space of the front year table, I have utilized the remaining space, on sheet B, by adding a very simple table for finding Easter day in any of the years for which the calendar may be set.

This Easter table is arranged as follows: Heading the table is the statement: "Easter is the Sunday next after the given date in March or April." Below this appear the numbers of all the years for which the front face of the calendar was arranged—in this case all the years from 1758 to 2056—arranged in consecutive order, in rows and columns. Each column contains eight year numbers, and below them contains a date either in March or April. To find when Easter occurred or will occur in a certain year, first set the calendar for that year. Then locate the year number in the Easter table and note the date in March or April below it. Looking up this date on the calendar as set, we can read off the date of the Sunday following it as that upon which Easter fell or will fall that year.

For instance, suppose we wish to know when Easter will fall in the year 1916. With the front face of the calendar before us, we first grasp the little handle and move sheet C until the indicating black mark is in line with 1916, as shown. It is seen that this year is underscored and is therefore a leap year, so the calendar is turned over and upon the other side appears the calendar correctly set to use for the year 1916. It will be noticed that the indicating black mark in the slot e on this side of the calendar is also in line with the number of the "leap" years. Therefore, if the year number is recognized at once as a "leap" year, the calendar may be set at once from this side and the front face need not be used.

Having set the calendar as described, we look for 1916 among the year numbers in the Easter table, and find it in the top row, to the right. Beneath it, at the bottom of its column, appears the date April 17. After locating this date on the calendar before us, we see it comes on Monday, and therefore Easter falls upon the following Sunday, or the 23d of April.

I am aware that in perpetual calendars sets of twelve numbers each containing thirteen rows of figures have been mounted to slide relatively to a card provided with cut-away portions corresponding to the months of the year. I am also aware that it is old, in perpetual calendars, to provide a sliding sheet between two other sliding sheets. I do not, therefore, claim these features as my invention, but claim only a construction, as is defined in the claims, wherein such features are incorporated with other features and arranged in such a way that by a simple single sliding movement, a complete and correct calendar for any year, "common" or "leap", will be afforded, without necessitating any computations and presenting the appearance of a calendar specially designed for such year.

Having now fully described my invention, what I desire to protect by Letters Patent is:

1. A calendar comprising two main sheets forming the front and rear faces of the calendar and each provided with cut-away portions corresponding to the twelve months of the year, seven rows of spaces on the front face corresponding to the seven days of the week and provided with consecutively arranged common year and leap year numerals, a slidable sheet arranged between the main sheets and provided on each side with a group of twelve sets of numerals corresponding to the twelve months of the year, each set of numerals having thirteen rows, the two groups of numerals being identical except for the provision of an additional numeral on the rear face in the set corresponding to the month of February, and a device on the front face of the intermediate sliding sheet adapted to be alined with any one of the seven rows of year numeral spaces on the front sheet, whereby the calendar may be adjusted from the front for either common years or leap years.

2. A calendar comprising two main sheets forming the front and rear faces of the calendar and each provided with cut-away portions corresponding to the twelve months of the year, seven rows of spaces on the front face corresponding to the seven days of the week, said face provided with year numerals, a slidable sheet arranged between the main sheets and provided on each side with a group of twelve sets of numerals corresponding to the twelve months of the year, each set of numerals having thirteen rows, the two groups of numerals being identical except for the provision of an additional numeral on the rear face in the set corresponding to the month of February, seven rows of spaces on the rear face corresponding with the seven rows of spaces on the front face, said rear face provided with year numerals, and spaces on the rear face provided with month and day numerals arranged in line with transversely alining numerals of the seven rows and indicating dates for the determination of movable holidays in the years represented by such transversely alining numerals.

In testimony of which invention, I have hereunto set my hand, at Philada., Penna., on this 14th day of January, 1916.

FRANK X. MOERK.